(12) United States Patent
Noh et al.

(10) Patent No.: US 8,187,410 B2
(45) Date of Patent: May 29, 2012

(54) HOLLOW FIBER MEMBRANE MODULE AND METHOD FOR MAKING THEREOF

(75) Inventors: Soo-Hong Noh, Wonju (KR); Oh-Sung Kwon, Seoul (KR); So-Dam Yoon, Seoul (KR); Hee-Sung Yoon, Seongnam (KR); Hyung-Mo Yang, Yangpyeong-gun (KR)

(73) Assignee: Woongjin Coway, Co. Ltd. (KR)

( * ) Notice: Subject to any disclaimer, the term of this patent is extended or adjusted under 35 U.S.C. 154(b) by 636 days.

(21) Appl. No.: 11/920,763

(22) PCT Filed: May 18, 2005

(86) PCT No.: PCT/KR2005/001457
§ 371 (c)(1),
(2), (4) Date: Jun. 2, 2009

(87) PCT Pub. No.: WO2006/123846
PCT Pub. Date: Nov. 23, 2006

(65) Prior Publication Data
US 2009/0308797 A1    Dec. 17, 2009

(51) Int. Cl.
*B01D 63/04* (2006.01)
(52) U.S. Cl. ............... 156/305; 210/136; 210/321.69; 210/347; 264/DIG. 48
(58) Field of Classification Search .......... 210/136, 210/321.69, 321.8, 321.89, 332, 345, 347; 156/305; 521/27; 264/DIG. 48
See application file for complete search history.

(56) References Cited

U.S. PATENT DOCUMENTS

| | | | |
|---|---|---|---|
| 5,238,563 A | | 8/1993 | Smith et al. |
| 7,128,837 B2 * | | 10/2006 | Behrendt et al. ........... 210/321.8 |
| 7,704,393 B2 * | | 4/2010 | Noh et al. ................ 210/321.69 |
| 2008/0135497 A1 * | | 6/2008 | Fuchs et al. .................. 210/767 |

FOREIGN PATENT DOCUMENTS

| | | | |
|---|---|---|---|
| JP | 7-194943 A | | 8/1995 |
| JP | 2000084375 A | * | 3/2000 |
| KR | 10-2002-0039383 A | | 5/2002 |
| KR | 10-2004-0097831 A | | 11/2004 |
| KR | 20-0368692 Y1 | * | 12/2004 |

OTHER PUBLICATIONS

International Search Report issued on Feb. 7, 2006 in connection with corresponding International Appln. No. PCT/KR2005/001457.

* cited by examiner

*Primary Examiner* — Terry Cecil
(74) *Attorney, Agent, or Firm* — Lerner, David, Littenberg, Krumholz & Mentlik, LLP

(57) ABSTRACT

The present invention purposes to provide a hollow fiber membrane module that minimizes the error rate in a manufacturing process thereof, disperses weight by separating an enlarged hollow fiber membrane module into a plurality of small modules, and provides a manufacturing method thereof. The present invention includes a central water tube having a plurality of inlets formed in the circumferential direction thereof, a central air tube provided in the central water tube, a plurality of housings longitudinally provided in the circumferential direction of the central water tube, a hollow fiber membrane provided in the respective housing and in which water is treated by difference of pressure, a fixing part fixing the lower part of the hollow fiber membrane to the housing, and a collector provided in the lower part of the housing, a plurality of small modules being provided in the housing.

20 Claims, 18 Drawing Sheets

HOLLOW FIBER MEMBRANE MODULE AND METHOD FOR MAKING THEREOF

CROSS REFERENCE TO RELATED APPLICATIONS

The present application is a national phase entry under 35U.S.C. §371 of International Application No. PCT/KR2005/001457, filed May 18, 2005, published in English, which is incorporated herein by reference.

TECHNICAL FIELD

The present invention relates to a hollow fiber membrane module using hollow fibers, and a method for manufacturing a hollow fiber membrane module. More particularly, it relates to a hollow fiber membrane module using hollow fibers and a method for manufacturing a hollow fiber membrane module improving an application for patent (Korean Application Number 10-2003-30323) to apply to an enlarged module.

BACKGROUND ART

The inventor of the present invention has already provided a hollow fiber membrane module using hollow fibers and a method for manufacturing a hollow fiber membrane module in the filed application for patent in Korea (Korean Application Number 10-2003-39323).

The invention of the already-filed application for patent, firstly, can increase the efficiency of removing pollutants, e.g., scale, created during water treatment, using hollow fiber membranes.

Secondly, the invention can increase the density of the hollow fiber membrane module by increasing the number of hollow fiber membranes disposed in one module.

Thirdly, the invention can prevent cutting of the hollow fiber membrane (caused by movement of the whole hollow fiber membrane) by reinforcing the strength of the hollow fiber membrane.

Fourthly, the invention can increase the size of a module by preventing falling of the hollow fiber membranes (which have one free end) or entanglement with each other.

Fifthly, the invention can increase the utilization rate of air (bubbles) and the removal rate of pollutants by intensively supplying air (ejected by a diffuser) to the hollow fiber membrane.

Sixthly, the invention can prevent generation of secondary waste, clogging of the hollow fiber membrane, and flowing of the pollutants into the treated water by improving the fixing structure of the hollow fiber membrane.

However, although a large hollow fiber membrane module is required for treating a large amount of water, it is problematically difficult to manufacture, maintain, operate, and repair the large hollow fiber membrane module.

Therefore, when a large amount of water is to be treated in the conventional method of water treatment using the membrane, instead of using a proper size of hollow fiber membrane module, multiple small modules are usually arranged and connected to each other with pipes and then used.

When the multiple small modules are used with connecting pipes, although the membrane functions normally, if there is a defect of the connecting condition of pipes, treated water can be deteriorated due to inflow of source water into the treated water.

In addition, because proper electric valves and pumps are used in each module according to the size of module, the number of electrical apparatuses increases. Therefore, mechanical problems of each electrical apparatuses and driving apparatuses may occur more easily.

DISCLOSURE

Technical Problem

Because of the above-described reasons, it is required to enlarge the hollow fiber membrane module. Therefore, the inventor of the present invention attempted to develop an enlarged hollow fiber membrane module and an enlarging method for the hollow fiber membrane module, by improving the hollow fiber membrane module that was already suggested in an application filed for patent (Korean Application Number 10-2003-30323).

In the developing process, to manufacture a large hollow fiber membrane module that can be actually used, some problems (which will be described later) that must be solved were found.

Firstly, it is required to enlarge the whole module and separate it into a plurality of small modules.

If a module consists of one large module, if a problem occurs in only one part, the whole module must be removed for repairing the problematic part, because a sealing condition of a free upper end of the hollow fiber membrane is not good. Although many problems occur in only one part, the whole module becomes useless, and it brings about an economic loss.

Therefore, instead of a structure consisting of only one module, a structure consisting of several modules is required, for easily preventing the defects.

In addition, when a hollow fiber membrane module is enlarged to over 1000 $m^2$/module, it is very difficult to manufacture the module as one unit even though it is possible. It is very heavy (it weighs several hundred kilograms). Therefore, a structure increasing the whole size and dispersing the weight is required.

Secondly, a temporary bonding material for temporarily fixing a hollow fiber membrane module must be spread stably.

When manufacturing a module with the conventional temporary bonding material, the temporary bonding material has to be spread within a thin height (about 5 mm). But a large size module has a radius of more than 1000 mm, and therefore uniformly spreading of the temporary bonding material is difficult.

Thirdly, when the temporary bonding material or complete bonding material hardens in the process of manufacturing a large module, control of temperature must be easy and energy loss must be minimized.

When the temporary bonding material or complete bonding material hardens, a temperature is controlled by using air or water having a predetermined temperature. Therefore, if the module is enlarged, uniformly controlling the temperature over the lower part of the module (having a wide area and a large size of volume) is difficult, and a lot of energy loss may occur.

In addition, to reduce the recovery energy of the temporary bonding material, minimizing the amount of temporary bonding material used for fixing the hollow fiber membrane to the module is required.

Fourthly, operation must be simple, and when cutting off (cutting off means a phenomenon in which a hollow fiber membrane is cut) occurs repairing must be easy.

It is difficult to say that the hollow fiber membrane has significant strength, because it doesn't have a special supporting means.

Therefore, when large and difficult pollutants are included in the source water during the operation of the hollow fiber membrane module, the hollow fiber membrane can be cut. If the hollow fiber membrane is cut, pollutants which don't pass through the minute pores of the hollow fiber membrane can be included in the treated water, by passing through the inner path of the cut hollow fiber membrane module. Therefore, the quality of the treated water can be deteriorated.

Therefore, when cutting off occurs in a hollow fiber membrane, the hollow fiber membrane must be removed from the reactor to be repaired.

If the large size module includes only one module, the total weight including the weight of the module and the weight of water (contained in the minute pores and inside the hollow fiber membrane, a collector, and an aerator) is several hundred kilograms. Therefore, it is difficult for an operator to operate the hollow fiber membrane module for repairing, and it is difficult to find a cut hollow fiber membrane among many membranes (the number of membranes is about several tens of thousands).

In addition, other normally functioning tens of thousands of hollow fiber membranes must be discarded, due to some parts in which cutting off occurs seriously.

In addition, when the ejecting hole of the diffuser is blocked by sludge or other pollutants, it is not easy to clean the whole diffuser and the ejecting hole.

Therefore, when the module is enlarged, easy maintenance and repair for the module is required.

Fifthly, when the module is manufactured, moved, and repaired, a free end of the hollow fiber membrane must not be allowed to fall down.

When manufacturing or pulling out the module (because of the problem, i.e., cutting off), due to a characteristic of its structure that an upper end of an end-free type of hollow fiber membrane module is free, the hollow fiber membrane may fall down easily, and a surface thereof may be damaged by breaking, or cutting off occurs.

Therefore, in the case of pulling out and moving the module, the hollow fiber membrane module must be fixed to prevent it from falling down.

Sixthly, backflow of the pollutants through the diffuser must be shut.

Because the hollow fiber membrane module is always submerged under source water (to be treated) including various pollutants, the diffuser can be easily polluted by the pollutants.

While the air is supplied continuously by the diffuser, there is little possibility of polluting the ejecting hole. But, when the air supplement is stopped, the ejecting hole can be blocked by the pollutants which flow backward. The blocked ejecting hole does not open by itself, even when the air is supplied again.

If the ejecting hole is blocked in this manner, the hollow fiber membrane near the blocked ejecting hole cannot be scrubbed, scoured, and vibrated by air. Therefore, the pollutants can be accumulated on the surface of the membrane, and the membrane cannot function as a membrane. The polluted part has a bad influence upon other parts (not yet polluted parts), so the lifespan of the membrane becomes shorter.

Therefore, it is required to prevent blocking of the ejecting hole caused by backflow of the pollutants into the ejecting hole when the air supplement from the diffuser is stopped during operation.

Seventhly, when a large module consists of a plurality of small modules, it is required to control all the functions of each small module.

The hollow fiber membrane module submerged in the material (which must be treated) may be cut so they are unusable during the operation.

If the cutting off occurs in a certain small module and the operation of all the modules must be stopped for the repair, during the repair, generation of treated water stops which has a negative effect on the whole process.

Therefore, if the cutting off occurs in a certain part of the large module, it should only be required to stop the operation of the problematic small module, instead of stopping the whole process.

The present invention was invented to satisfy above-described requirement. Firstly, the present invention was invented for the purpose of providing a hollow fiber membrane module having an enlarged overall size and consisting of a plurality of separated small modules, and a manufacturing method thereof.

Secondly, the present invention purposes to provide a hollow fiber membrane module on which a temporary bonding material uniformly spreads, and a manufacturing method thereof.

Thirdly, the present invention purposes to provide a method for manufacturing a hollow fiber membrane module in which the hardening temperature of the temporary bonding material or complete bonding material can be easily controlled and energy loss can be reduced, and a manufacturing method thereof.

Fourthly, the present invention purposes to provide a hollow fiber membrane module that can be easily controlled and repaired when the cutting off occurs. The present invention also purposes to provide a manufacturing method thereof.

Fifthly, the present invention purposes to provide a hollow fiber membrane module of which the upper part can be fixed when manufactured, moved, and repaired. The present invention also purposes to provide a manufacturing method thereof.

Sixthly, the present invention purposes to provide a hollow fiber membrane module in which backflow of pollutants through the diffuser can be prevented, and a manufacturing method thereof.

Seventhly, the present invention purposes to provide a hollow fiber membrane module having a large size and consisting of a plurality of small modules of which a water treating function can be controlled independently, and also purposes to provide a manufacturing method thereof.

Technical Solution

So as to achieve the above-described purposes, the present invention provides a large hollow fiber membrane module consisting of a plurality of separated small modules manufactured respectively.

For this purpose, a hollow fiber membrane module according to the present invention includes a housing forming the external configuration thereof, a hollow fiber membrane disposed in the housing, and where water treatment is performed, a fixing part fixing a lower part of the hollow fiber membrane to the housing, a collector disposed in the lower part of the housing communicating with an inner path of the hollow fiber membrane and in which the treated water is collected, a plurality of small modules having diffusing plates disposed in the lower part of the housing and ejecting the air bubbles, a central water tube communicating with the collectors of the respective small modules and flowing the treated water, and a central air tube communicating with the diffusers of respective small modules and supplying air.

Here, the central water tube and the central air tube are disposed as a double tube at the center, and the small modules are disposed in the circumferential area of the double pipe and connected respectively, such that space usage rate can be preferably increased.

In addition, a diffuser of the small module has a structure disposing a lateral diffusing plate (for ejecting air) on the inner wall of the housing, disposing a central diffusing plate to be extended from the inner wall of the housing to the center of the housing, and forming ejecting holes (ejecting air) on both sides of the central diffusing plate.

According to this structure, air may permeate to the center part of the hollow fiber membrane, so entirely even pollutant-removing efficiency can be acquired.

The central diffusing plate may be disposed as one or more.

In addition, according to the present invention, a fixing means fixing the upper part of the end-free typed hollow fiber membrane may be further included.

For example, when the small module is pulled out of an apparatus, the upper part (free end) of the hollow fiber membranes can fall down because of the void space between the hollow fiber membranes. Therefore, the upper part of the hollow fiber membrane can be selectively fixed, by providing the fixing means in the upper part of the small module.

The fixing means may include an expanding object disposed in the upper part of the housing of the small module and expanding inward, and an air pressure impressing means supplying air into the expanding object so as to expand the expanding object.

In addition, as a fixing part of the hollow fiber membrane is disposed on the collector which is disposed in the lower part of the housing, a space allocating means, for allocating a space for the collector and supporting the temporary bonding material for fixing the hollow fiber membrane, may be further included in the present invention. The space allocating means includes a bag inserted into the collector of the housing, and a water supplying means so as to fill the bag with water.

Therefore, the bag filled with water makes a space for forming a collector, by contacting the inner wall of the housing, and the temporary bonding material can be formed on the bag (which acts as a bottom surface for it).

Here, the liquefied temporary bonding material may be maintained or hardened, as the water supplying part supplies cold or warm water.

In addition, an anti-backflow means which is disposed between the central air tube and the respective small module, and flows the air only toward the diffuser, may be further included in the present invention.

The anti-backflow means is provided in various structures, for example, a structure using elastic restoring force of a spring, a structure using a restoring force caused by its own weight, or a structure using a driving motor. The structure of the anti-backflow means opening the pathway from the central air tube to the diffuser is not specifically defined as described above.

Here, in addition to the above-described structure disposed in the respective small modules, the anti-backflow means may be disposed in the central air tube, so backflow from the diffuser can be prevented in the entire hollow fiber membrane module.

In addition, the present invention may include an opening and closing means disposed in the connecting line between the central water tube and the respective small module, for shutting the connecting line when required.

A method for manufacturing a hollow fiber membrane module integrally provided with a diffuser, a collector, and a fixing part of a hollow fiber membrane, according to the present invention, includes a method for fixing a hollow fiber membrane including the steps of allocating a space by inserting the bag into the housing, fixing the hollow fiber membrane on the allocated space with a temporary bonding material, forming a complete bonding material on the temporary bonding material, and withdrawing the temporary bonding material.

In addition, so as to fix the hollow fiber membrane to a fixing part of the housing, the present invention includes steps of supplying warm water into the bag, pouring the temporary bonding material liquefied at its melting point on the bag, forming a bundle of hollow fiber membranes in the temporary bonding material, and hardening the temporary bonding material by supplying cold water to the bag.

Advantageous Effects

According to the hollow fiber membrane module and the method for manufacturing the hollow fiber membrane module of the present invention, ease of making a large hollow fiber membrane can be enhanced.

In addition, a temporary bonding material can be spread uniformly in the manufacturing process. When the temporary bonding material or complete bonding material is hardened, control of temperature is easy, and the amount of bonding material used and energy loss can be minimized.

In addition, the operation is simplified, and when the cutting off occurs a repair is made more easily.

DESCRIPTION OF REFERENCE NUMERALS INDICATING PRIMARY ELEMENTS IN THE DRAWINGS

Figure 1:
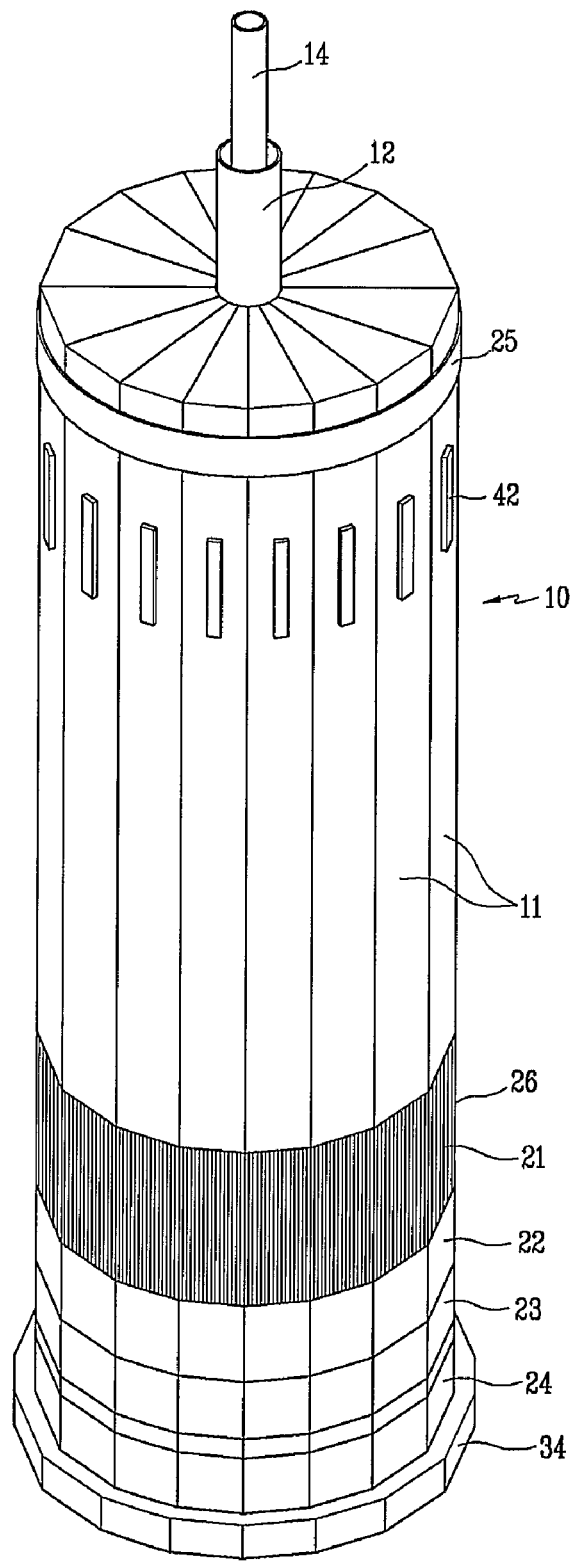
FIG. 1 is a perspective view of an entire hollow fiber membrane module according to an exemplary embodiment of the present invention.

10: hollow fiber membrane module 11: small module
12: central water tube 13: inlet
14: central air tube 15: exit
20: housing 21: hollow fiber membrane
22: mounting part 23: collector
24: diffuser 25: band
26: source water inlet 27: connecting part
28: main path 29: lateral diffusing plate
30,32,33: central diffusing plate 31: ejecting hole
40: expanding object 41: air supplying line
42: fixing frame 50: valve seat
51: valve 52: spring seat
53: hole 54: spring
55: path 56: valve block
57: slope 58: closing plate
60: plug 61: wire
62: operation bar 63: O-ring
64: guider

BEST MODE

Hereinafter, with reference to the accompanying drawings, preferable exemplary embodiments of the present invention will be described in detail.

Figure 2:
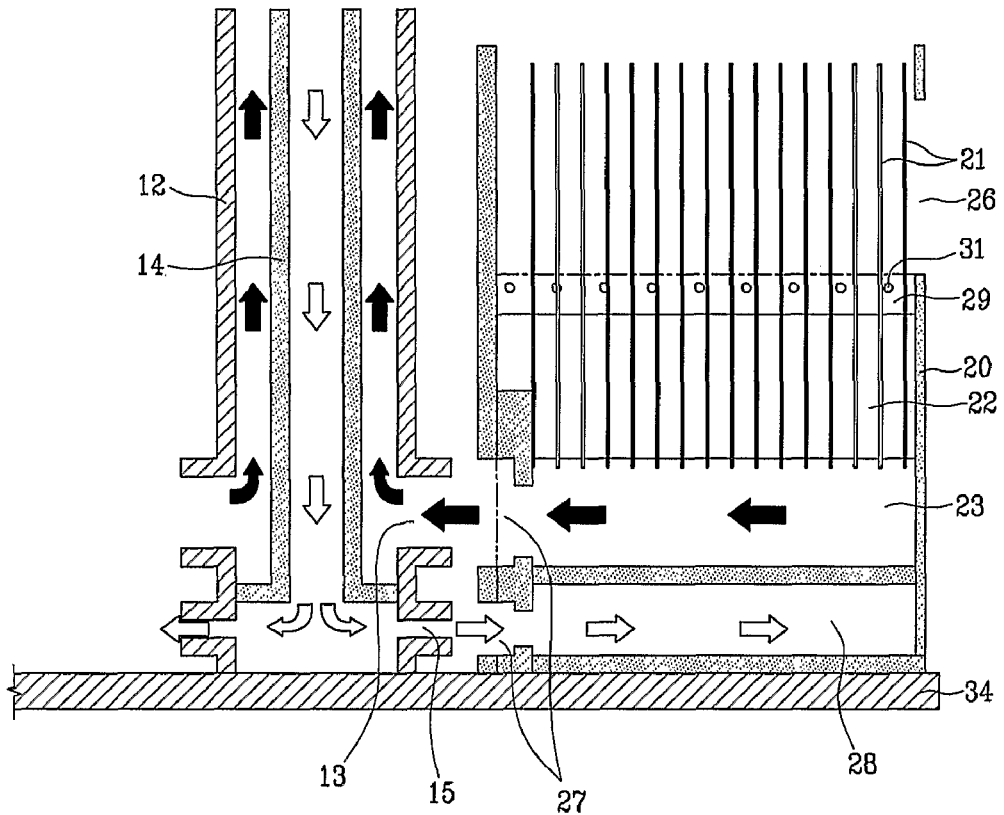
FIG. 2 is a cross-sectional view illustrating a combining structure of a hollow fiber membrane module according to an exemplary embodiment of the present invention.
Figure 3:
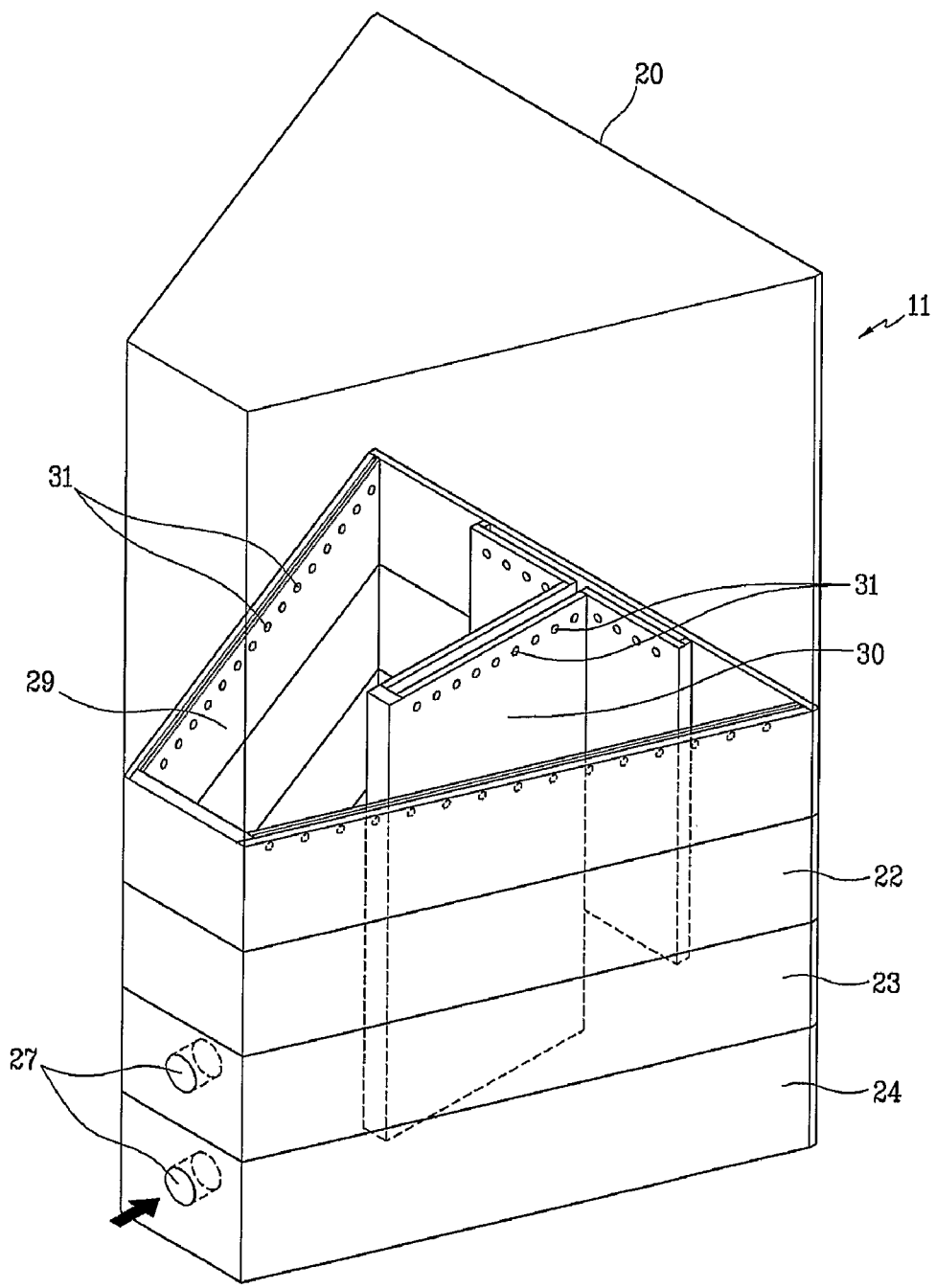
FIG. 3 is a perspective view illustrating a part of a hollow fiber membrane module according to an exemplary embodiment of the present invention.

FIG. 1 is a perspective view of an entire hollow fiber membrane module according to an exemplary embodiment of the present invention. FIG. 2 is a cross-sectional view illustrating a combining structure of a hollow fiber membrane module according to an exemplary embodiment of the present invention. FIG. 3 is a perspective view illustrating a part of a hollow fiber membrane module according to an exemplary embodiment of the present invention.

With reference to the accompanying drawings, a hollow fiber membrane module 10 includes a central water tube 12 (in which treated water flows) disposed vertically and having inlets 13 formed (with predetermined distance) on its cylindrical surface, and further includes a central air tube 14 disposed in the central water tube 12 in the longitudinal direction, extended with a lower surface of the central water tube 12, and having exits 15 formed on the cylindrical surface. The hollow fiber membrane module 10 further includes small modules 11 vertically disposed in the circumferential direction of the central water tube 12 (which is vertically disposed), and having inlets 13 and exits 15.

The small module 11 in which water treatment is actually performed includes a housing 20, a hollow fiber membrane module 21, a collector 23, a diffuser 24, and a fixing means. The hollow fiber membrane module 21 is disposed in the housing 20 in the longitudinal direction, and its lower part is fixed in the fixing part 22. In the hollow fiber membrane 21, the water treatment is performed due to a pressure difference. The collector 23 is disposed under the fixing part 22 of the housing 20 and communicates with the inlet 13 of the central water tube 12 and an inner path of the hollow fiber membrane 21. The treated water is collected in the collector 23. The diffuser 24 is disposed under the housing 20, communicates with exit 15 of the central air tube 14, and ejects the air (bubbles) to the hollow fiber membrane. The fixing means fixes an upper end of the hollow fiber membrane.

Here, the central water tube 12 and the central air tube 14 are disposed as a double tube. An inner tube is the central air tube 14 and an outer tube is the central water tube 12.

Therefore, the central air tube 14 (inner tube) is extended to the lower end of the central water tube 12, and communicates with the exit 15 formed under the central water tube 12. The inlet 13 formed at the upper part of the exit 15 communicates with the central water tube 12.

The distance between the exit 15 and the inlet 13 may be variable according to the size and the number of the small modules 11 (disposed in the circumferential area). Preferably, 12 or 24 small modules may be disposed according to the size, and the exits 15 and inlets 13 may be formed every 15 or 30 degrees in the circumferential direction.

The housing 20 (which forms the external configuration of the small modules) is made of acryl, PVC, etc. As shown in FIG. 1, the housing 20 is formed to have a trapezoid shape (an angle between two lateral side walls is 15-30 degrees), and is disposed in the fan-out direction of the central air tube 12. Therefore, the small modules 11 are disposed in the circumferential direction of the central water tube 12, such that the side wall of a small module contacts the side wall of other small modules.

In the housing, a plurality the hollow fiber membranes 21 are disposed in the longitudinal direction. A fixing part 22, the collector 23 (communicating with an inner path of the hollow fiber membranes 21), and the diffuser 24 are sequentially disposed in the lower part of the housing. The collector 23 and the diffuser 24 respectively communicate with an inlet 13 and an exit 15 of the central water tube 12 through the connecting part 27.

Therefore, each small module 11 is independently connected to the central water tube 12, and if it is required, some small modules 12 can be removable from the central water tube 12.

Here, some airtight means (not shown in the accompanying drawings), i.e., packing means, may be disposed at the respective connecting parts 27 (formed in the housing), or the inlet 13 and the exit 15 (formed in the central water tube 12), so as to seal the contacting part.

Reference numeral 25 in FIG. 1 is a band (not illustrated) banding a plurality of the small modules 11 arranged along the central water tube 12, and reference numeral 26 is a source water inlet inflowing the source water into the housing 20. Reference numeral 34 is a lower supporting part (not illustrated) for supporting weight of the small modules 11 and fixing them.

In addition, the collector 23 is a space communicating with the connecting part 27 of the housing 20, and is provided under the fixing part 22 of the hollow fiber membrane 21. An end of the hollow fiber membrane 21 (fixed in the fixing part 22) is extended to the collector 23, and the inner path of the hollow fiber membrane 21 communicates with the collector 23.

More particularly, the fixing part 22 fixing the hollow fiber membrane 21 is mounted on the inner wall of the housing 20. A method for forming the fixing part 22 at the void space on the collector 23 will be described later.

Figure 4:
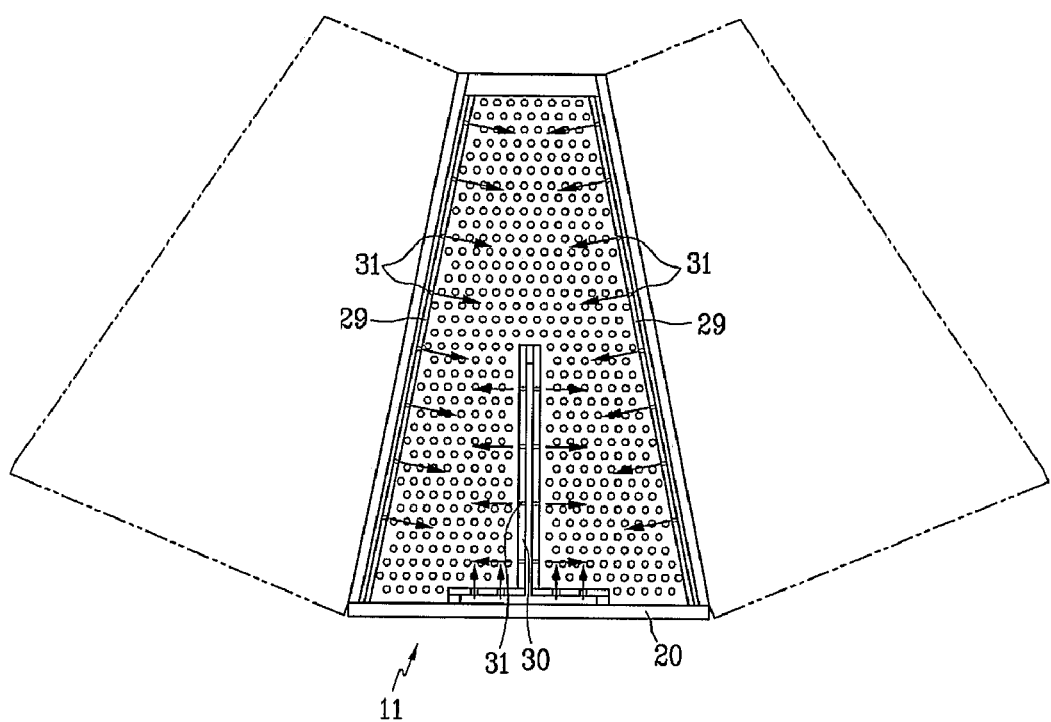
FIG. 4 is a cross-sectional view of FIG. 3 illustrating a structure of diffuser according to an exemplary embodiment of the present invention.

In addition, as shown in FIG. 3 and FIG. 4, the diffuser 24 includes a main path 28, a lateral diffusing plate 29, a central diffusing plate 30, and a plurality of ejecting holes 31. A main path 28 is provided at the bottom of the housing, and communicates with the central air tube 14 through the connecting part 27 and the exit 15. A lateral diffusing plate 29 communicates with the main path 28, and extends upward from the fixing part 22, having a space between the lateral diffusing plate 29 and an inner wall of the housing 20. The ejecting holes 31 are formed at a predetermined distance from each other on the lateral diffusing plate 29, and eject air. The central diffusing plate 30 communicates with the lateral diffusing plate 29, and is extended to the center of the housing 20. The ejecting holes 31 are formed at a predetermined distance from each other on the lateral diffusing plate 30, and eject air.

Therefore, the air flowing into the diffuser 24 is ejected to the central part of a bundle of the hollow fiber membrane 21 from the outer part thereof through the ejecting hole 31 of the lateral diffusing plate 29, and the air is ejected to the outer part of a bundle of the hollow fiber membrane 21 from the central part thereof through the ejecting hole 31 of the central diffusing plate 30.

The lateral diffusing plate 29 extends along the lateral wall of the housing 20, while making a space between the lateral diffusing plate 29 and the lateral wall of the housing 20. The lateral diffusing plate 29 has an open lower end communicating with the main path 28 of the diffuser 24 and a closed upper end exposed on the fixing part 22.

Therefore, the air (flowing into the main path 28) goes upward through the space between the lateral wall of the housing 20 and the lateral diffusing plate 29, and is ejected to the hollow fiber membrane 21 through the ejecting hole 31 formed in the lateral diffusing plate 29.

In addition, the central diffusing plate 30 has a structure of having its own inside space. Like the lateral diffusing plate 29, the central diffusing plate 30 has an open lower end communicating with the main path 28 of the diffuser 24 and a closed upper end exposed on the fixing part 22, and the air flowing into the inside space of the central diffusing plate 30 is ejected to the hollow fiber membrane 21 through the ejecting hole 31 formed in both lateral sides of the central diffusing plate 30.

Here, the central diffusing plate 30 is preferably formed to extend to the center of the housing 20 from the outer end thereof, as the housing 20 is formed to have a trapezoid shape having different length inner and outer walls radially formed from the central water tube 12. The length of the central diffusing plate 30 (i.e., the length from the outer end of the housing 20 to the inner end of the central diffusing plate 30) is not specifically defined.

Figure 5:
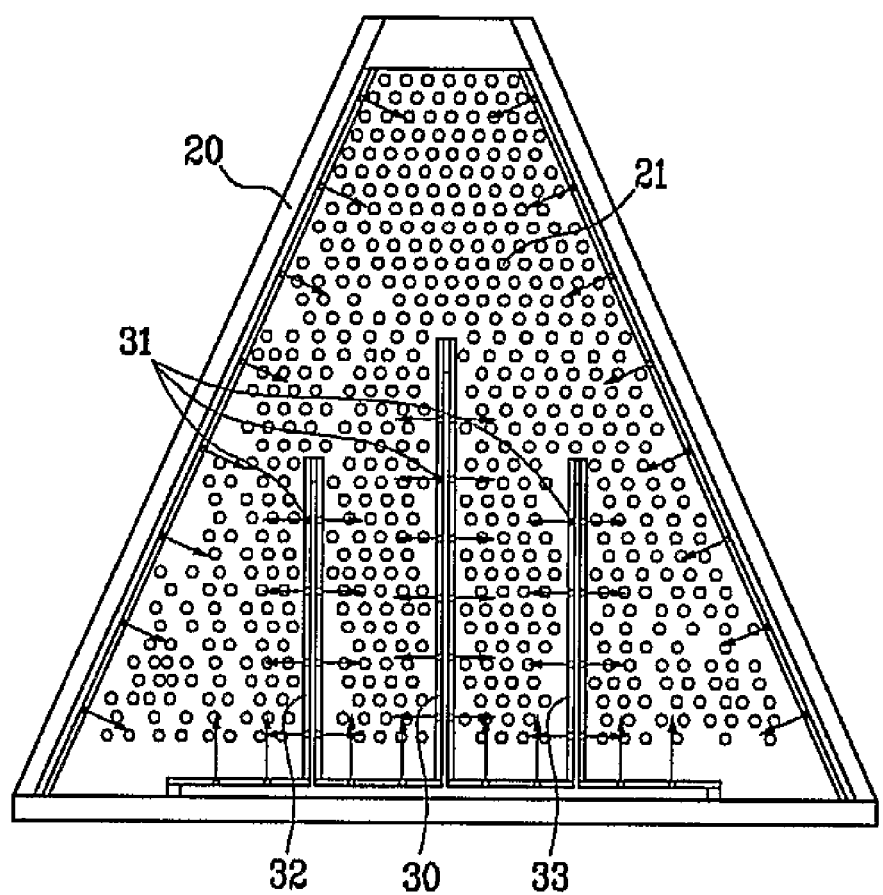
FIG. 5 and FIG. 6 are cross-sectional views of the FIG. 3 illustrating a structure of a diffuser according to another exemplary embodiment of the present invention.

In addition, FIG. 5 illustrates a central diffusing plate 30 according to another exemplary embodiment of the present invention. With reference to FIG. 5, the three central diffusing plates 30, 32, and 33 are disposed, in parallel, to have predetermined lengths. On both sides of the central diffusing plates 30, 32, and 33, the ejecting hole 31 is formed at a predetermined height to eject the air to the hollow fiber membrane 21.

In this case, a middle-positioned central diffusing plate 30 is the longest one among the three central diffusing plates, and other two central diffusing plates 32 and 33 disposed beside the longest one are relatively short.

Because the housing 20 is formed to have a trapezoid shape, it is preferable to control the length of the two central diffusing plates 32 and 33, according to the distance from the side wall of the housing.

Figure 6:
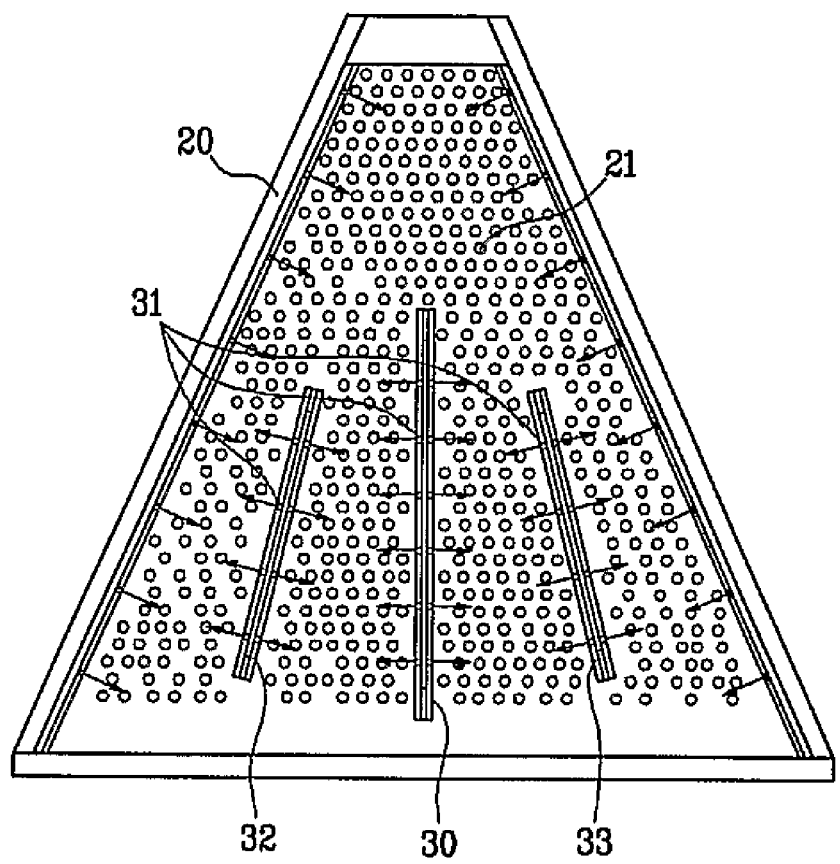

In addition, because the hollow fiber membrane 21 disposed at the outer part (i.e., the outer corner) of the housing (having a trapezoid shape) has a long distance to the central diffusing plate 30, 32, and 33, as shown in FIG. 6, the central diffusing plate may be disposed to form a predetermined angle.

In more detail, the three central diffusing plates 30, 32, and 33 are provided in the housings 20 of respective small modules. The middle-positioned central diffusing plate 30 among the three central diffusing plates is vertically disposed at the outer end of the housing 20, and other two central diffusing plates 32 and 33 are disposed radially from the central water tube 12. The ejecting holes 31 are formed at a predetermined distance on both sides of each central diffusing plate 30, 32, and 33.

Therefore, the two central diffusing plates 32 and 33 are formed to have an angle, and the outer end of the central diffusing plate 32 and 33 are disposed near the outer corner of the housing. Due to this structure, the air can be equally diffused to all the hollow fiber membrane 21.

In the exemplary embodiment, there are three central diffusing plates, but the present invention is not limited to the described number.

The fixing means fixes the upper part of the hollow fiber membrane 21 when the small module 11 is pulled out of a reactor for manufacturing, or for imperatively required maintenance or repair during the operation. If the fixing means do not fix the free upper end of the hollow fiber membrane 21 well, the hollow fiber membrane falls down due to the weight of the membrane itself and the weight of water (contained inside and in minute pores of the hollow fiber membrane).

This phenomenon may occur more seriously when the small module 11 is abruptly and rapidly pulled out of the reactor. In this case, the hollow fiber membrane 21 is broken, the surface of the membrane is damaged, or a minute core of the membrane gets fatal defects, so the membrane may lose its own function.

Figure 7:
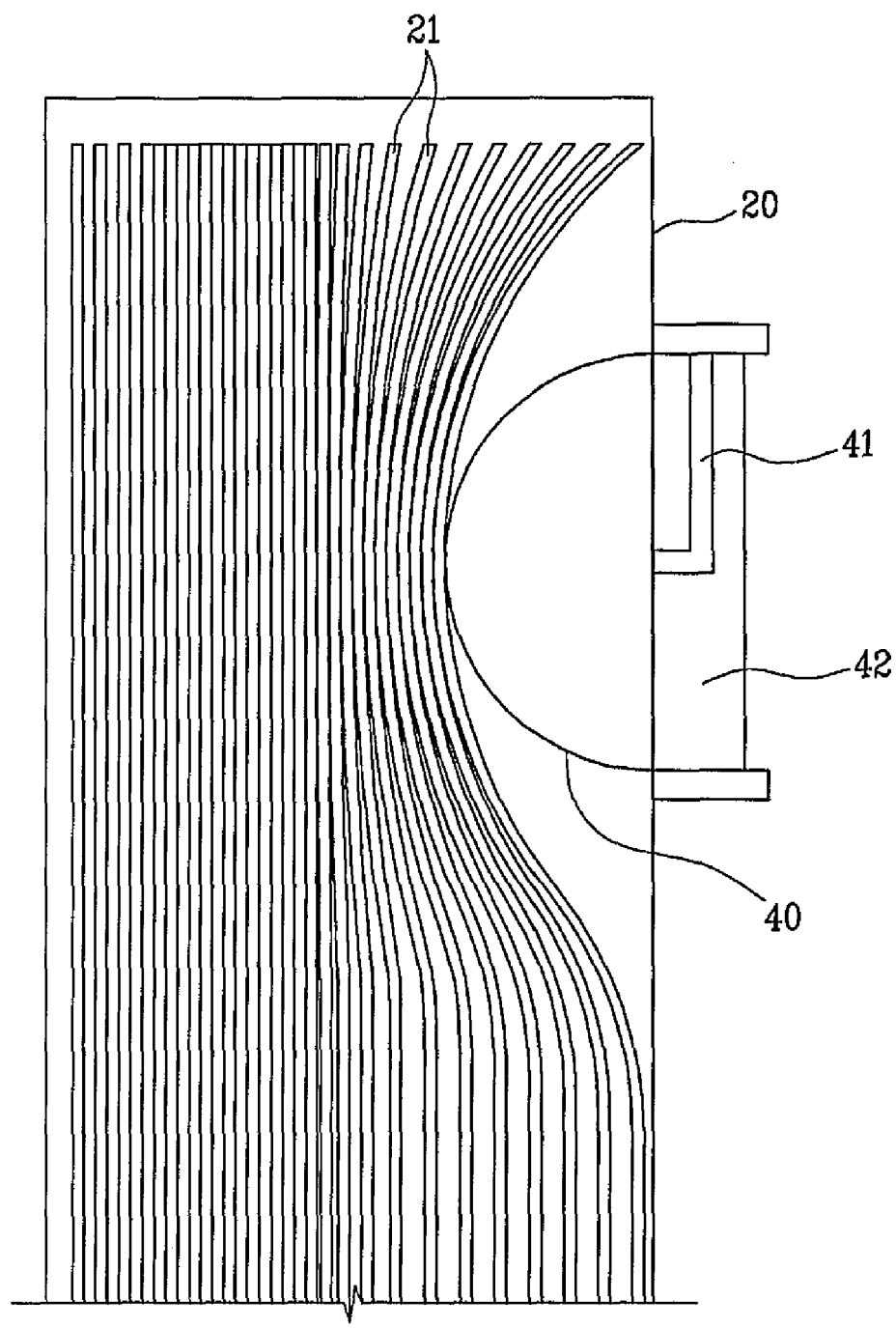
FIG. 7 is a schematic cross-sectional view illustrating an upper part structure of the hollow fiber membrane module according to an exemplary embodiment of the present invention.

Therefore, as shown in FIG. 7, the fixing means includes an expanding object 40 disposed in the upper part of the housing 20 and expanding to the inside of the housing 20, a fixing frame 42 fixing the expanding object 40 and having an air supplying line 41 which communicates with the expanding object 40 for supplying the air, and an air supplying pump (not shown in the drawings) that communicates with the air supplying line 41 for supplying the air.

According to an exemplary embodiment of the present invention, it is preferable to use a balloon as the expanding object 40, and the balloon is preferably made of latex.

In addition, the expanding object 40 is preferably disposed at the outer end part of the housing 20 (i.e., the outer end part from the central water tube 12), and expands to the central water tube 12. More preferably, the housing may be vertically disposed along the longitudinal direction of the housing.

Therefore, if the air supplying pump is operated to supply the air to the air supplying line 41 before the small module 11 is pulled out of the reactor, the expanding object 40 (i.e., balloon) expands in the housing 20 and pushes the upper part of the hollow fiber membrane 21 to the inner wall of the housing 20.

The hollow fiber membranes 21 are pushed to the inner wall of the housing 20, and are aggregated densely to contact each other.

In the above-described state, the hollow fiber membrane 21 is pushed between the balloon (the expanding object 40) and the inner wall of the housing 20, due to the elastic force of the balloon. Therefore the hollow fiber membrane 21 can be fixed without physical damage, for example the crushing or transformation of the surface or minute pores of the membrane.

The module 10 further includes an anti-backflow means disposed under the central water tube 12 which passes the air (flowing through the central air tube 14) to the main path 28 through the exit 15, and prevents inflow of the air from the main path 28 of the diffuser 24 to the exit 15.

Figure 8:
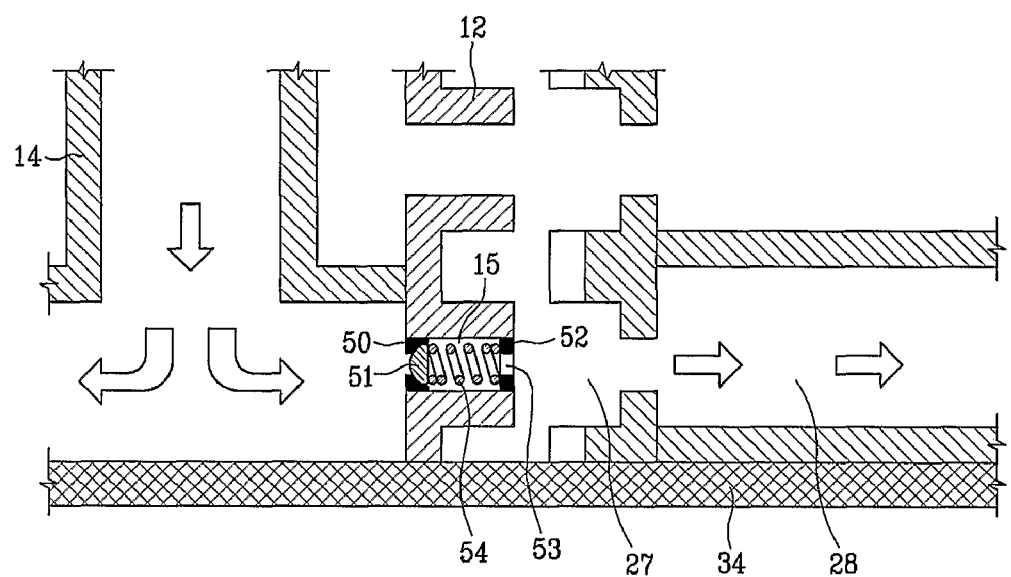
FIG. 8 is schematic cross-sectional view illustrating a structure for preventing air backflow according to an exemplary embodiment of the present invention.

As shown in FIG. 8, the anti-backflow means may include an air check valve disposed in the exit 15 of the central water tube 12.

An air check valve using an elastic force of a spring includes a valve seat 50 disposed at an entrance side of the exit 15, a valve 51 selectively contacting the valve seat 50 so as to open and close the valve seat 50, a spring seat 52 disposed at an outlet side of the exit 15 and having a hole (at the center) to pass the air, and a spring 54 disposed to have a elastic force between the spring seat 52 and the valve 51.

Therefore, the air flowing into the central air tube 14 presses the valve 51, and then the valve 51 is detached from the valve seat 50. The air flows through the space formed between the valve seat 51 and the valve 50, and then the air flows into the main path 28 of the diffuser 24 through the central hole 53 of the valve seat 52.

When the air is not supplied to the central air tube 14, the valve 51 is pushed to contact the valve seat 50 due to the elastic restoring force of the spring 54. Therefore the path of air is blocked, and then the backflow of the air from the main path 28 of the diffuser 24 to the central air tube 14 does not occur.

Figure 9:
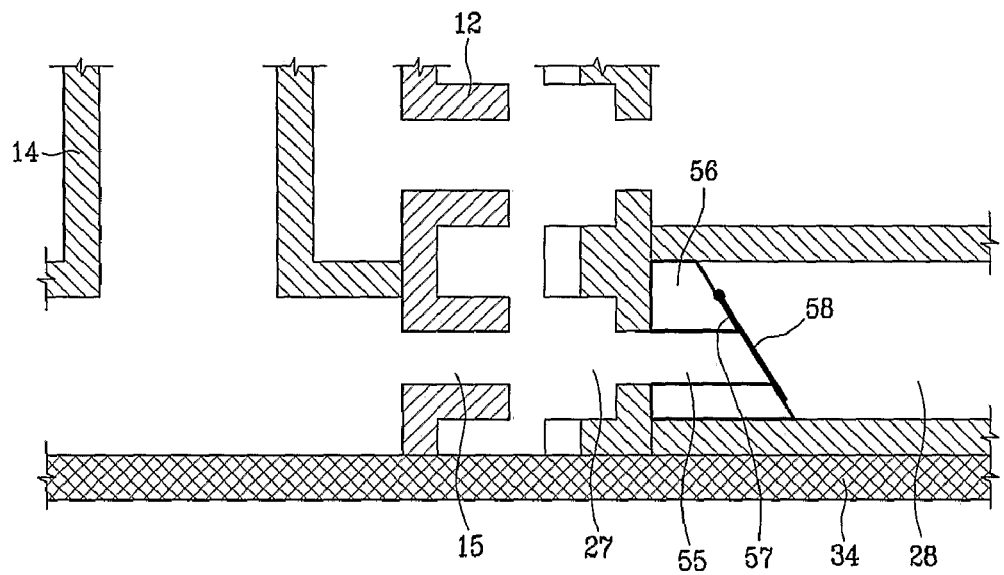
FIGS. 9 and 10 are schematic cross-sectional views illustrating a structure for preventing air backflow according to another exemplary embodiment of the present invention.
Figure 10:
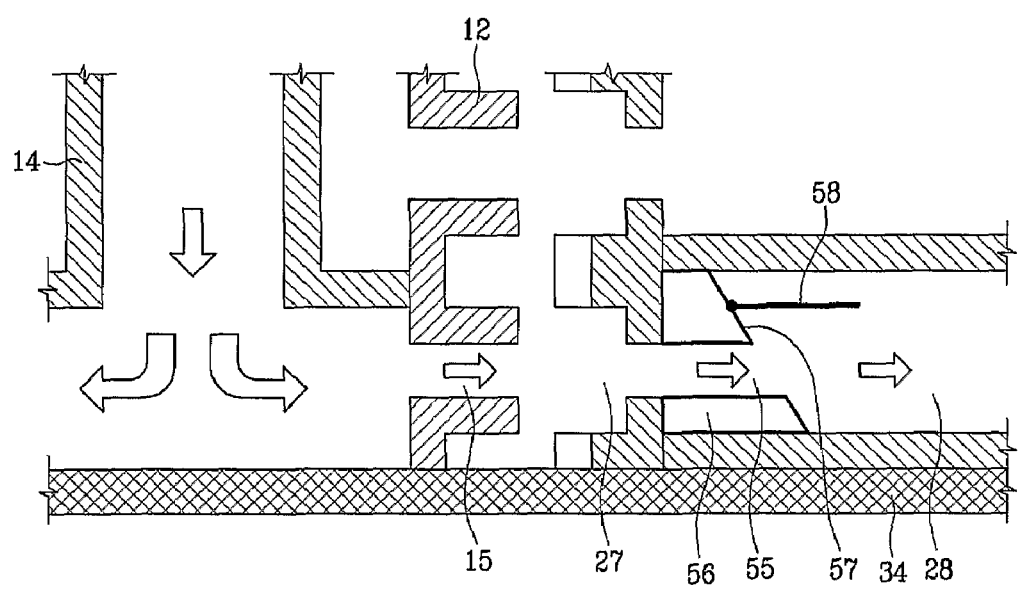

FIG. 9 and FIG. 10 illustrate an anti-backflow means according to another exemplary embodiment of the present invention.

According to the accompanying drawings, the anti-backflow means includes a valve block 56 which is mounted in the main path 28 and has a path 55 formed in the middle part to communicate with the connecting part 27, and a closing plate 58 which is rotatably mounted at a slope 57 and selectively opens and closes the path 55.

The closing plate 58 is mounted with its axis at the upper part of the path 55, and is rotatable due to the weight of the closing plate.

Therefore, the air flowing into the central air tube 14 flows into the path 55 of the valve block 56 through the exit 15 and the connecting part 27, and then, due to the pressure of the air, the closing plate 58 is lifted up. Therefore the air can freely flow into the main path 28 of the diffuser 24.

When the air is not supplied into the central air tube 14, the closing plate 58 is rotated due to the weight of the closing plate, and then the backflow of the air from the main path 28 of the diffuser 24 to the central air tube 14 is prevented.

In addition, according to another exemplary embodiment of the present invention, the anti-backflow means may be mounted in the central air tube 14 instead of the each small module, so as to prevent the backflow of all air in the module at one time.

Figure 11:
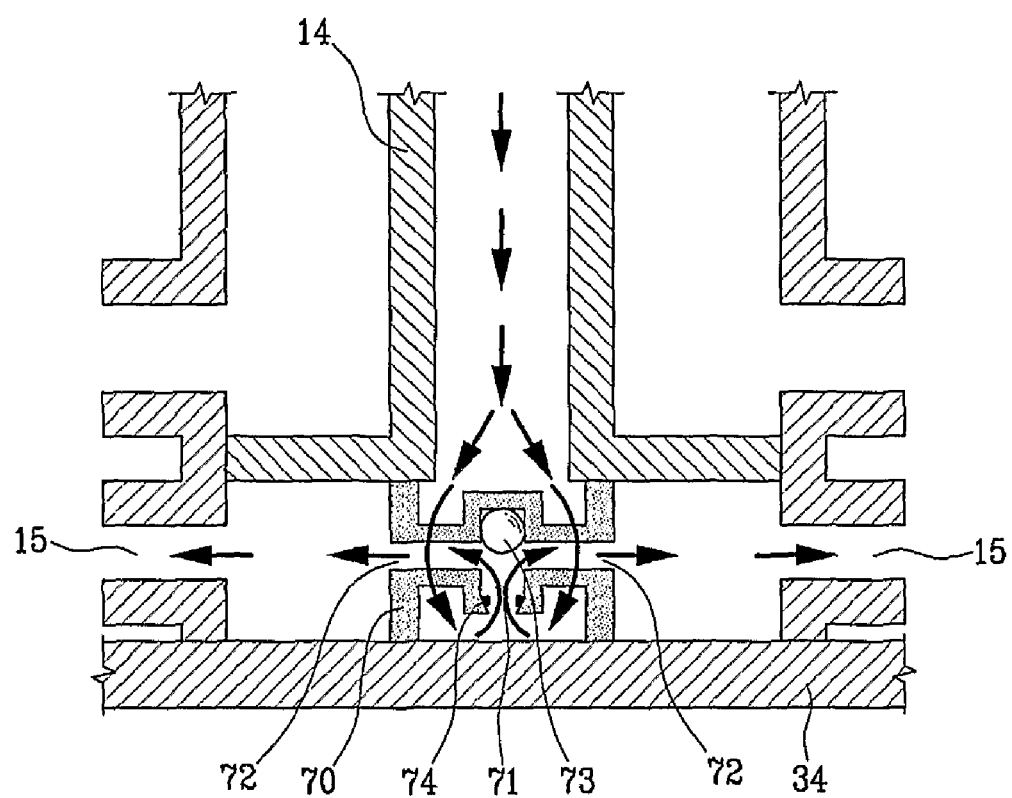
FIGS. 11 to 15 are schematic drawings illustrating structures for preventing air backflow according to other exemplary embodiments of the present invention.
Figure 12:
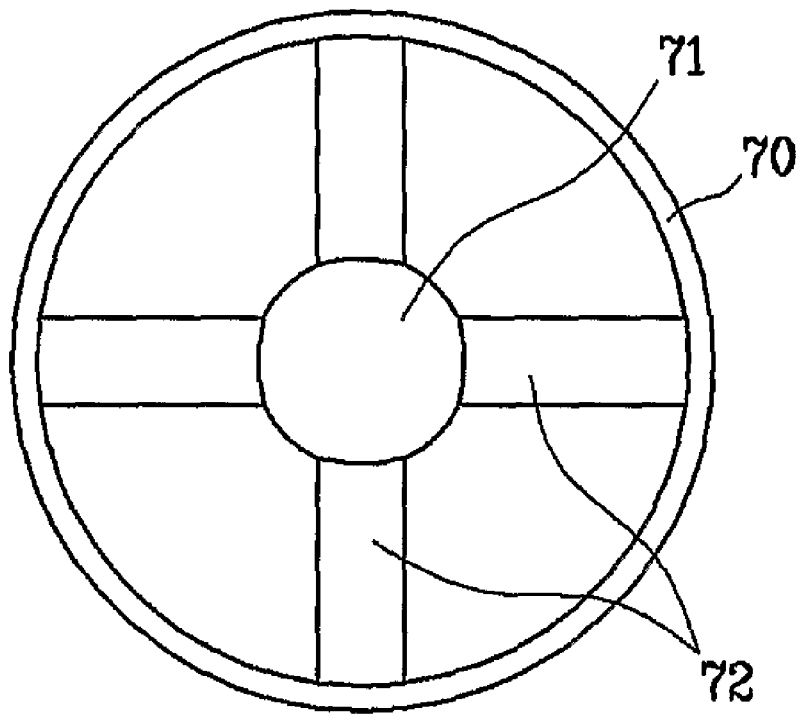
Figure 13:
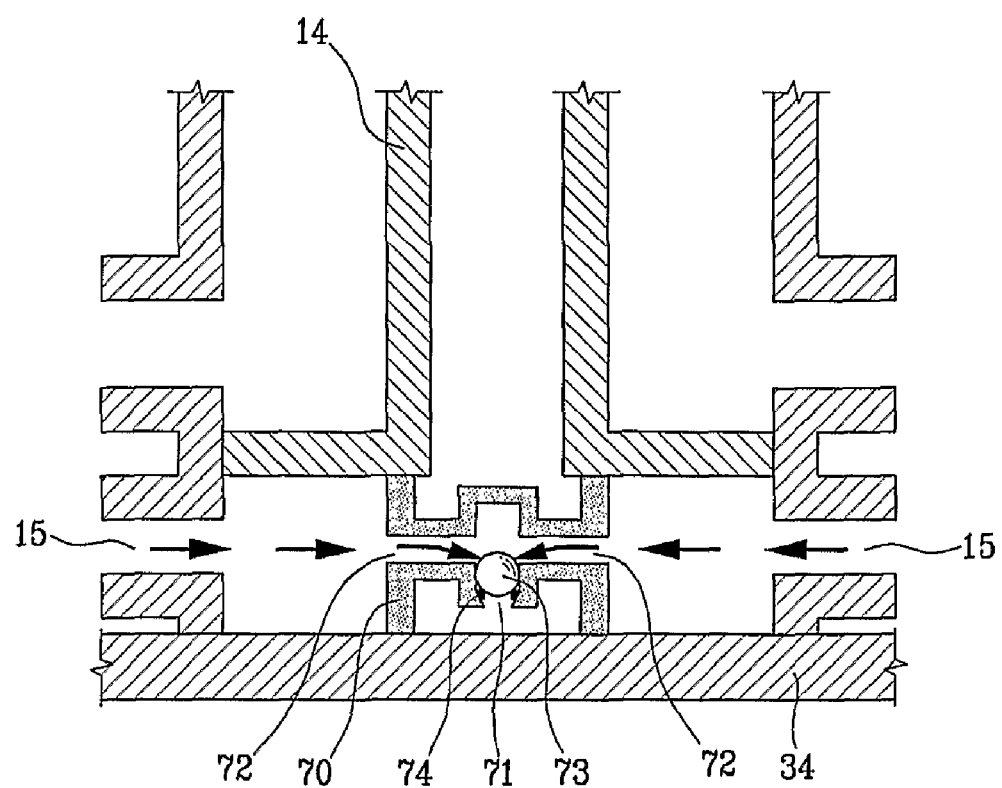

Another anti-backflow means according to another exemplary embodiment of the present invention is illustrated in FIG. 11 to FIG. 13. With reference to the accompanying drawings, an anti-backflow means includes a check valve block 70 and a ball 73. The check valve block 70 is mounted in the lower part of the central air tube 14. At the center of the check valve block 70, the intake hole 71 communicating with the central air tube 14 is formed to face downward. On the circumferential outer wall of a check valve block 70, a plurality of exhaust holes 72 connecting an intake hole 71 to the exit 15 are formed. A ball 73 is disposed to be movable up and down in the intake hole 71. The ball 73 can be lifted up by the air flowing in through the intake hole 71, and then the intake hole 71 and the exhaust hole 72 are connected to each other.

Here, the composition of the ball 73 is not limited. When the ball goes down to the lower position of the intake hole 71 due to gravity, it is preferable to dispose a sealing material 74 made of rubber or silicon on the contacting part of the intake hole 71 (the lower part of the intake hole 71 where the ball contacts) for sealing the lower part of the intake hole 71 and the ball 73.

As shown in FIG. 12, four exhaust holes 72 are provided, and are connected to the intake hole 71 (disposed in the center of the check valve block 70) and the outer circumferential wall of the check valve block 70.

As shown in FIG. 11, the air supplied to each small module through the central air tube 14 flows into the check valve block 70 and passes through the intake hole 71. At this time, the ball 73 is lifted up by the pressure of the air passing through the intake hole 71, and the intake hole 71 and the exhaust hole 72 are connected to form one pathway, and then the air is supplied to the small module connected to the exit 15 through the exhaust hole 72.

On the contrary, as shown in FIG. 13, in the case of backflow from the exit 15 to the central air tube 14, the air flows into the check valve block 70 through the exhaust hole 72. At this time, the ball 73 goes down to the lower part of the intake hole 71 due to the weight of the ball, and contacts closely to the sealing material 74 disposed at the lower part of the intake hole 71. Due to the pressure of the air flowing in through the exhaust hole 72, the ball 73 contacts the sealing material 74 more closely, and closes the intake hole 71.

Therefore, the pathway between the exhaust hole 72 and the intake hole 71 is closed, and the air flowing into the exhaust hole 72 cannot flow into the central air tube 14 through the intake hole 71.

Figure 14:
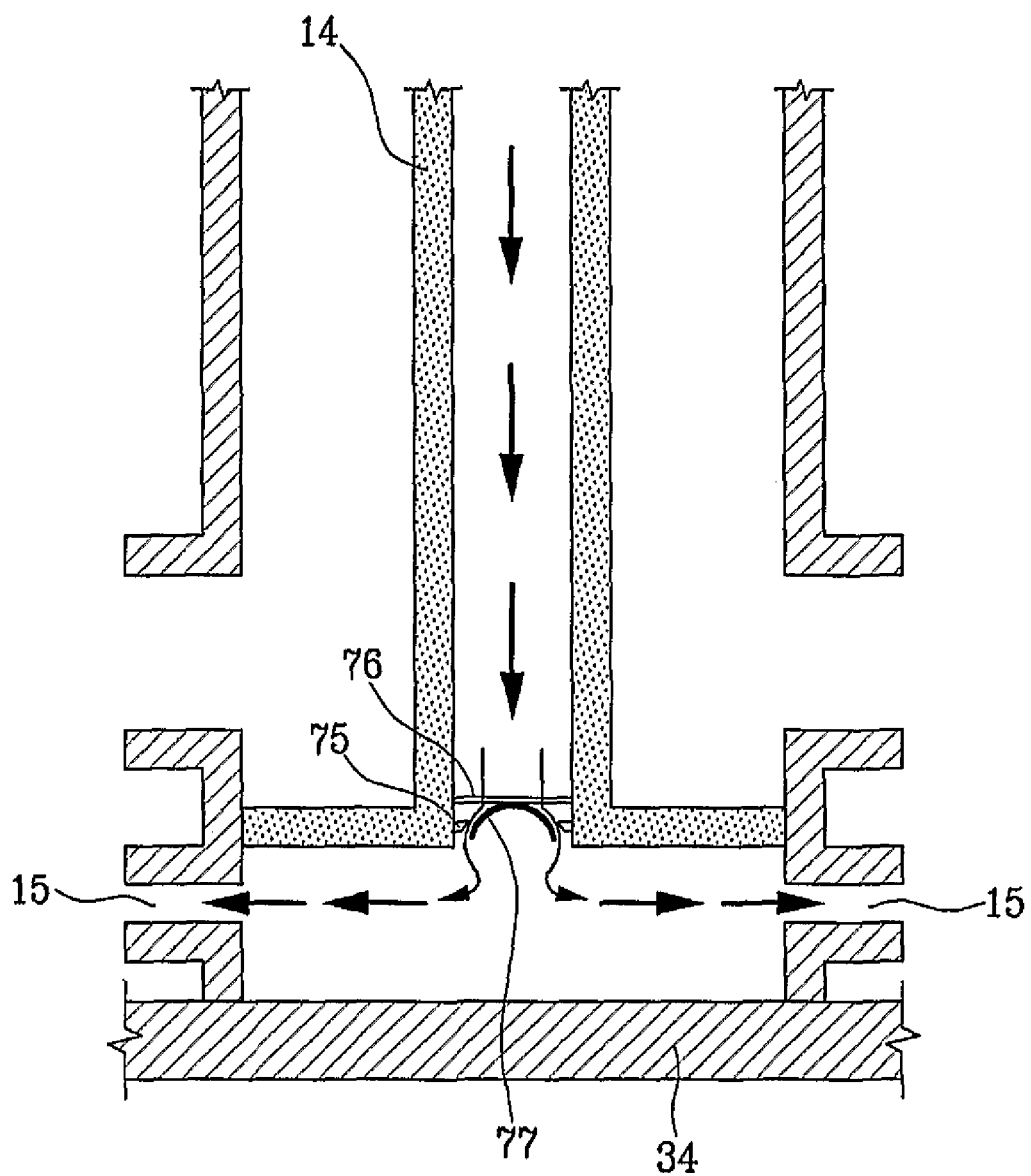
Figure 15:
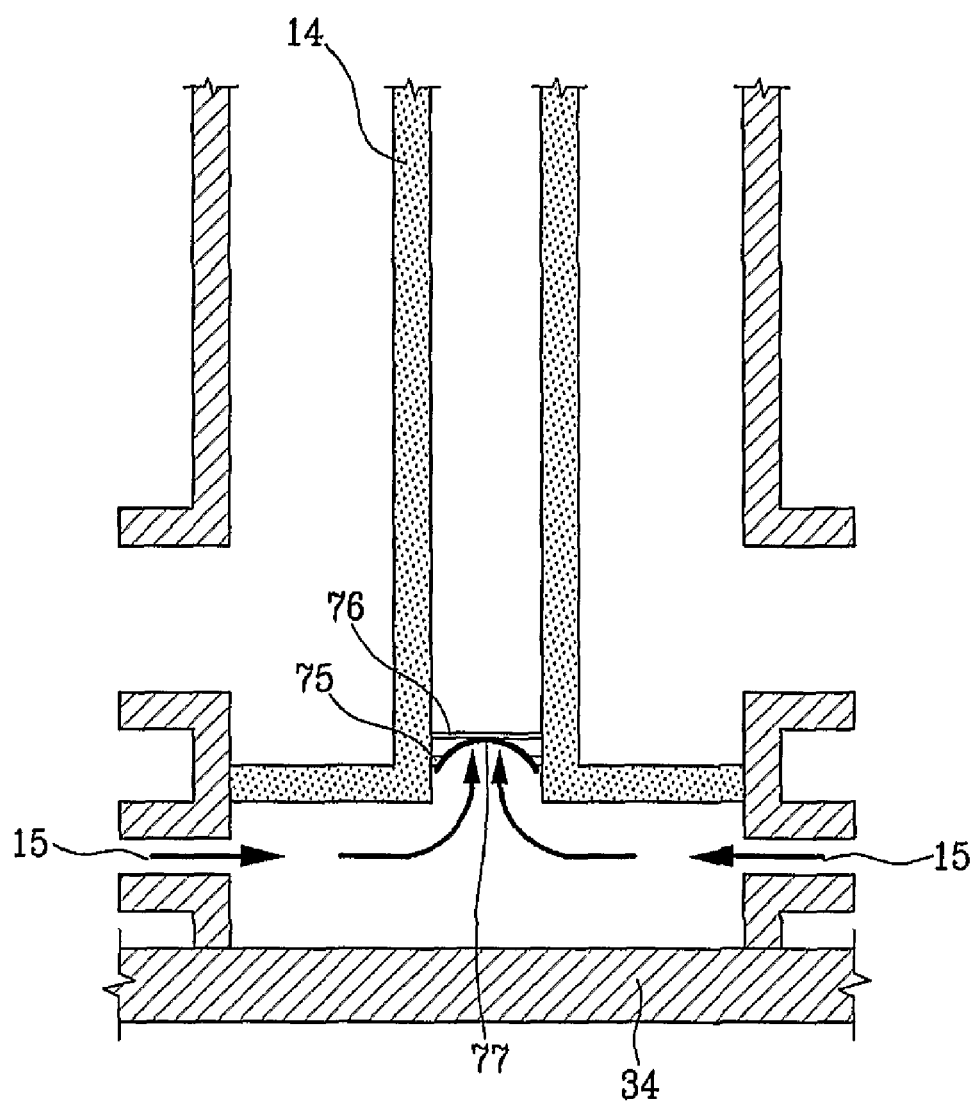

FIGS. 14 and 15 illustrate an anti-backflow means disposed in the central air tube 14, according to another exemplary embodiment of the present invention.

With reference to the accompanying drawings, the anti-backflow means includes a seat 75 disposed on the inner circumferential wall of lower part of the central air tube 14. It further includes a closing membrane 77 disposed (with a bracket) in the central air tube 14, elastically contacted with the seat 55, for opening and closing the central air tube 14.

The closing membrane 77 is formed in the shape of a domed hemisphere, and is disposed such that a convex surface thereof faces the upper part of the central air tube 14. The closing membrane is mounted to a bracket 76 disposed to cross the central air tube 14.

Therefore, when the air flows into the exit 15 from the central air tube 14, the closing membrane 77 is pushed by the air and distorts. Then, the contacting position of the seat 75 and the closing membrane 77 is opened, and the air passes through. In the meantime, when the air flows backward from the exit 15 to the central air tube 14, the closing membrane 77 (having a shape of a domed hemisphere) spreads, and contacts the seat 55.

Therefore, the central air tube 14 is closed by the closing membrane 77 closely contacting with the seat 75, and the air cannot flow backward.

The module 10 according to the present invention further includes the opening and closing means disposed in the line connecting the central water tube 12 and the collector 23 of the respective small module, for shutting the line in which the treated water flows.

Figure 16:
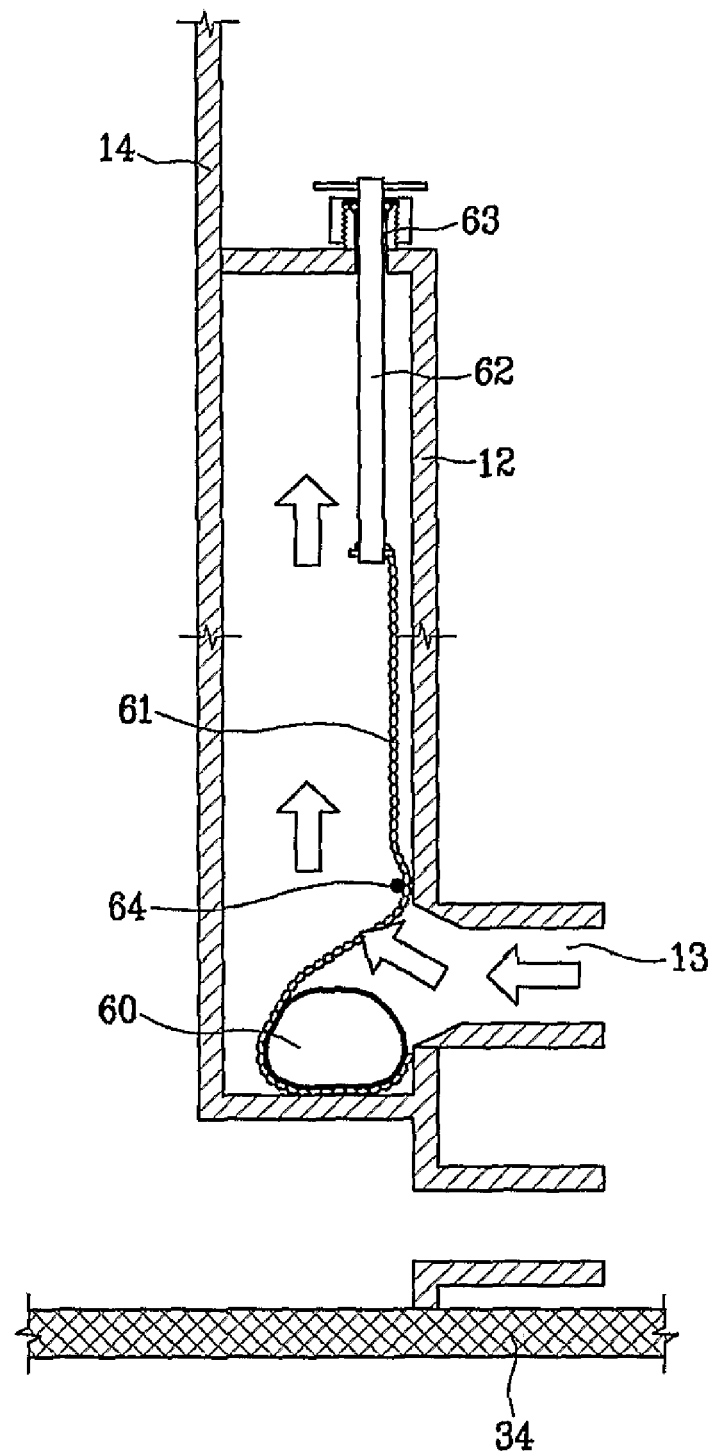
FIG. 16 is a partial cross-sectional view illustrating a closing structure of a small module according to an exemplary embodiment of the present invention.
Figure 17:
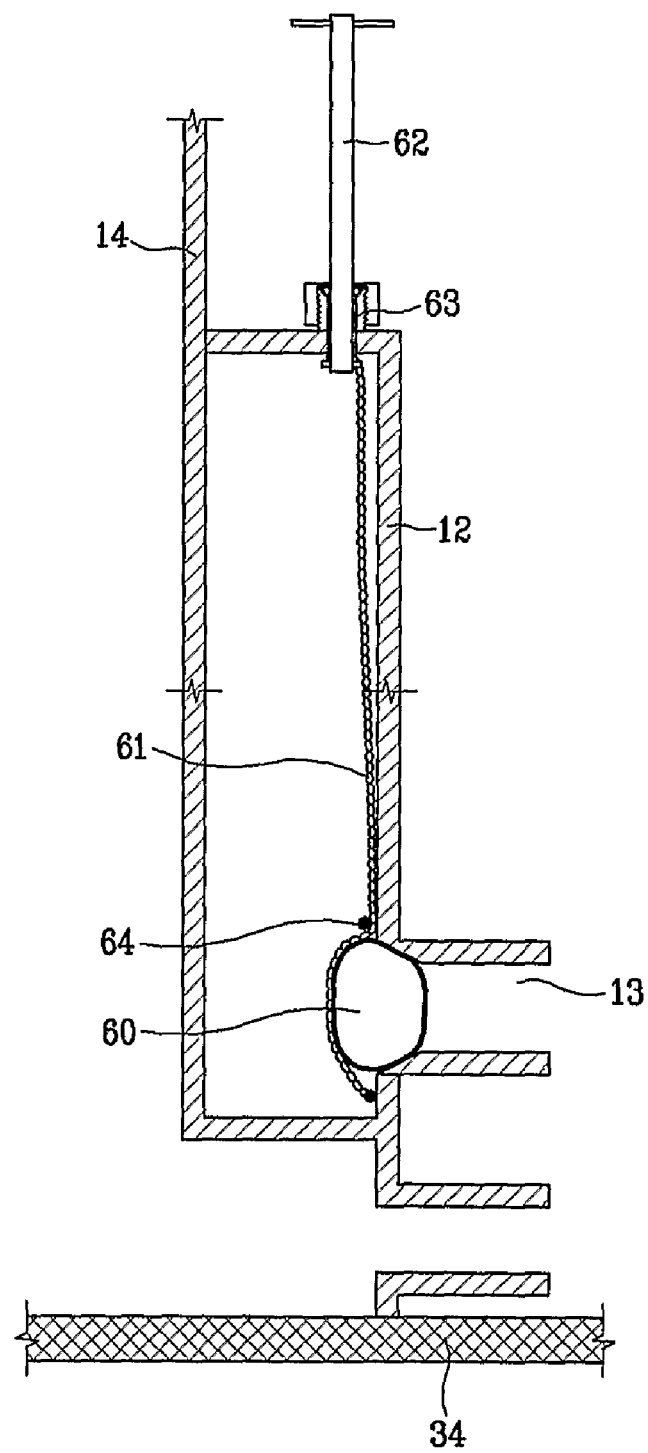
FIG. 17 is a drawing illustrating a closing structure of a small module according to an exemplary embodiment of the present invention.

FIG. 16 and FIG. 17 illustrate the opening and closing means according to an exemplary embodiment of the present invention. With reference to the drawings, the opening and closing means includes a plug 60 rotatably disposed at the lower part of the inlet 13 so as to open and close the inlet 13, a wire 61 mounted to the upper part of the plug 60, and the operation bar 62 is slidably mounted on the central water tube 12 and the lower part thereof is connected to the wire 61 so as to pull the wire 61.

Therefore, when the operation bar 62 is pulled, the wire 61 is pulled and the plug 60 (connected to the wire 61) is rotated. The plug 60 then shuts the inlet 13 connected to the respective small module 11. Therefore, the water treating operation of the respective small module is stopped, because there is no difference of pressure applied on the hollow fiber membrane of the respective small module as a driving power.

Here, an O-ring 63 is further disposed between the central water tube 12 and the operation bar 62 for maintaining air-tightness.

In addition, reference numeral 64 in the accompanying drawings is a guider guiding a wire 61. The guider 64 guides the wire 61 along a side wall (on which the inlet 13 is formed) of the central water tube 12, so as to magnify the pressing force of the plug 60 to the inlet 13.

The plug 60 is made of a material having ductility and elasticity, and is preferably made of rubber, polyurethane, or silicone.

Figure 18:
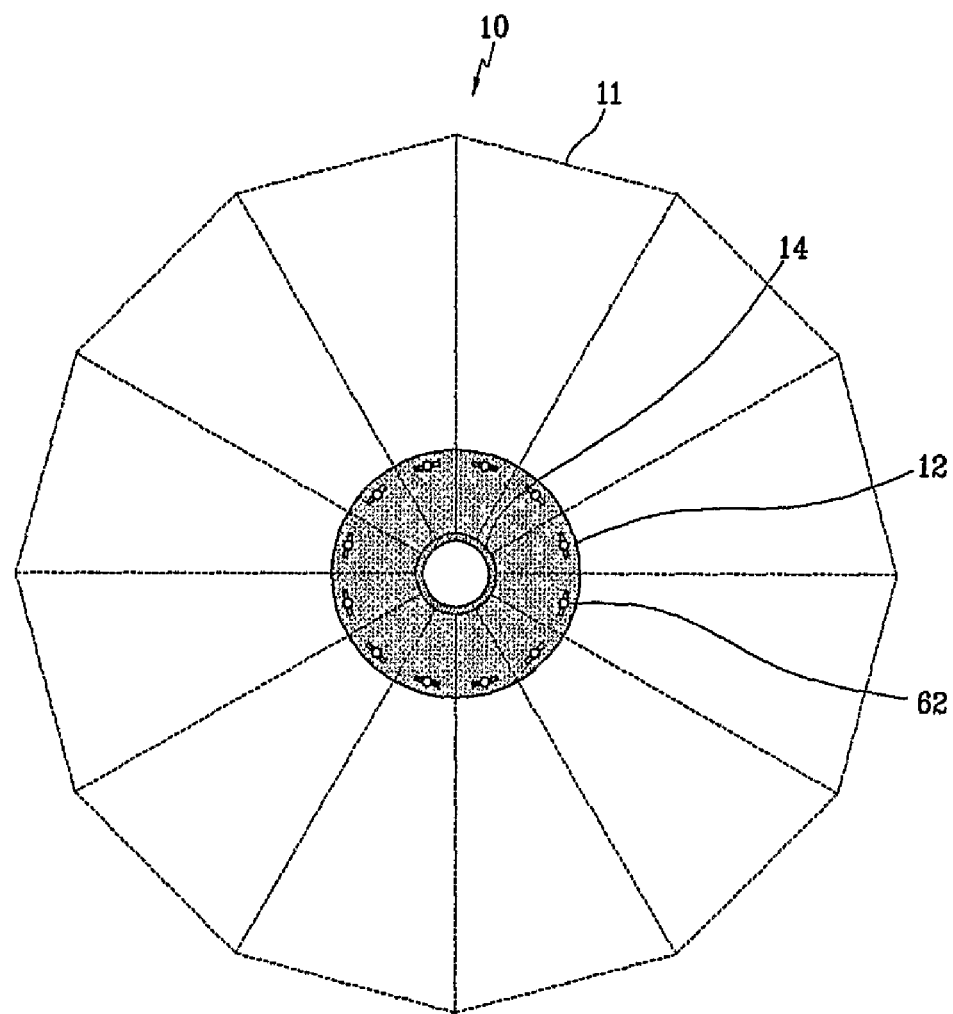
FIG. 18 is a top plan view illustrating a closing structure of a small module according to an exemplary embodiment of the present invention.

FIG. 18 is a top plan view of the module 10 illustrating a structure having an operation bar 62 which is disposed at a position corresponding to the small module 11, so as to stop the water-treating function.

When the respective small module 11 is normally operated, the operation bar 62 is pushed downward so as to release the wire 61, and by releasing the wire 61, the plug 60 is rotated and the inlet 13 is opened. When the hollow fiber membrane is cut in one small module, the operation bar 62 disposed at the position corresponding to the small module is pulled and the corresponding inlet 13 (connecting the corresponding small module 11 and the central water tube 12) is closed, so as to stop the function of the corresponding small module 11.

In the case of stopping the function of the corresponding small module 11, the treated water influenced by the stopped part is about 10% because the area (that the corresponding small module 11 has) in the whole module is $1/24$ to $1/12$ of the total.

Therefore, the corresponding small module 11 can be separated from the module for repair etc., without a great influence on the entire amount of water.

Here, in the module 10 (including a plurality of small modules 11), the small module 11 where a cutting off occurs can be easily found by supplying air.

If some of the hollow fiber membranes in the whole module are cut, turbidity of treated water increases, and the color and smell of the treated water is deteriorated.

When the phenomenon occurs, if the process is stopped and the air is supplied (in the opposite direction to the treated water), bubbles are generated at the cut point and go up.

By confirming the position where the bubbles go up, the small module where the cutting off occurs can be easily found.

On the other hand, the fixing part 22 (at the lower part of the housing 20) fixes the lower part of the hollow fiber membrane 21 to the housing 20 with a temporary fixing material and a complete fixing material. Because the fixing part 22 must be disposed at a predetermined position spaced from the upper part of the diffuser 24, a space allocating means allocating the space for the collector 23 and supporting the temporary fixing material for fixing the hollow fiber membrane 21 is required.

For this, a bag made of vinyl is used as a space allocating means in the present exemplary embodiment of the present invention.

The space allocating means includes a vinyl bag inserted into the space (where the collector is formed) through the connecting part 27 formed in the housing 20, and a water supplying part disposed to communicate with the inside of the vinyl bag and fill the inside of the bag with water.

It is preferably that the water supplying part may supply cold water or warm water, the reason being described later.

The bag must be made of a material that is not transformed by cold water or warm water, it must have a structure that is not transformed by cold water or warm water, and it must be larger than the collector 23. There is no other definition of the bag.

Hereinafter, a process for fixing the hollow fiber membrane 21 using the space allocating means will be described.

Initially, the bag is inserted into the space on the diffuser 24 through the connecting part 27, and then the bag is expanded by supplying warm water into the bag.

If the bag is filled with the warm water, the bag gradually expands in the horizontal direction and closely contacts the inside wall of the housing 20. If more warm water is supplied, the bag expands in the vertical direction to have a predetermined height, contacting the inside wall of the housing 20.

After allocating the space (where the collector 23 is made) by filling the bag with the warm water, the temporary bonding material is applied on the upper surface of the bag.

Here the liquefied temporary bonding material (liquefied at its melting-point) is applied to have a predetermined height on the bag, by being poured into the housing through the upper part thereof.

Then, a bundle of the hollow fiber membranes 21 already fixed with the complete bonding material is disposed on the liquefied temporary bonding material, and the temporary bonding material is hardened by supplying cold water into the bag.

As the cold water is supplied into the bag, the temperature of the bag goes down and the liquefied temporary bonding material applied on the bag is hardened.

When the temporary bonding material is completely hardened, the hollow fiber membrane 21 is completely fixed by the complete bonding material on the temporary bonding material. In this process, when the complete bonding material is hardened, heat may be generated. If the heat is rapidly generated, the temporary bonding material can be melted, and a crack can be formed in the complete bonding material (rapidly hardened with heat generation) due to self-contraction.

Therefore, after the complete bonding material is supplied on the temporary bonding material as described above, the temporary bonding material can be kept in the liquefied state for the predetermined time by continuously circulating the low temperature water in the bag, while the complete bonding material is transformed to solid from liquid, such that the temporary bonding material can be kept in the solid state, and the contraction of the complete bonding material can be prevented by suppressing the heat generation.

After the complete bonding material is completely formed (i.e., hardened), the hollow fiber membrane 21 can be fixed in the housing 20 with the collector 23 and the fixing part 22 (formed on the collector 23), by withdrawing the temporary bonding material and removing the bag.

Hereinafter, the operation of the present invention will be described. Waste water (source water) flows into the inside of the housing 20 of the respective small modules 11 through the source water inlet 26 of the housing 20, and is filtered by the hollow fiber membrane 21 of the respective small module 11. The filtered water is gathered in the collector 23 (connected to the inner path of the hollow fiber membrane 21) of the respective small modules 11, it flows into the central water tube 12 through the connecting part 27 of the housing 20 and the inlet 13 of the central water tube 12, and is then exhausted through the central water tube 12.

The air is supplied through the central air tube 14, and is then supplied to the diffuser 24 of the respective small modules 11 through the exit 15 formed in the lower part of the central air tube 12. Then, the air is supplied to the main path 28 of the diffuser 24, it passes the lateral diffusing plate 29 and the central diffusing plate 30, and is then ejected to the inside of the housing 20 through the ejecting hole 31 formed in the respective diffusing plate.

The air (injected in this manner) vibrates the hollow fiber membrane 21 by going up the housing 20, and whisks away the pollutants attached on the hollow fiber membrane 21.

At this time, the air can be supplied to all the hollow fiber membranes 21 in the housing 20, by injecting the air (bubbles) through the lateral diffusing plate 29 and the central diffusing plate 30 at the side part and the center part of the housing 20.

As described above, the present invention provides an advanced hollow fiber membrane module.

As those skilled in the art would realize, the described embodiments may be modified in various different ways, all without departing from the spirit or scope of the present invention.

The invention claimed is:

1. A hollow fiber membrane module comprising:
   a central water tube, in which treated water flows, having a plurality of inlets formed in a circumferential direction thereof;
   a central air tube provided in the central water tube, extended from a bottom surface of the central water tube, having a plurality of exits formed in a circumferential direction thereof, and receiving an air supply; and
   a plurality of small modules, wherein each of the plurality of small modules comprises
      a housing longitudinally provided in the circumferential direction of the central water tube and connected to the inlets and the exits,
      wherein each housing comprises
         a hollow fiber membrane provided in the housing and treating water with a difference of pressure;
         a fixing part fixing a lower part of the hollow fiber membrane to the housing;
         a collector provided in the lower part of the housing, communicating with an inner path of the hollow fiber membrane, gathering treated water coming from the hollow fiber membrane, and flowing the treated water to a respective central water tube inlet; and
         a diffuser provided in the housing, connected to a respective central air tube exit and ejecting the air.

2. The hollow fiber membrane module of claim 1, further comprising:
   a fixing means selectively fixing the upper part of the hollow fiber membrane and including:
      an expanding object provided in an upper part of the housing and expanding;
      a fixing frame fixing the expanding object to the housing and having an air supplying line which is connected to the expanding object so as to supply the air into the expanding object; and
      an air supply pump which is connected to the air supplying line and which supplies air to the air supplying line.

3. The hollow fiber membrane module of claim 2, wherein the expanding object is a balloon made of an elastic material.

4. The hollow fiber membrane module of claim 1, further comprising:
   a space allocating means including:
      a bag inserted into a space where the collector is formed, through a connecting part formed in the housing; and
      a water supplying part that is provided to communicate with the inside of the bag, and which allocates the space for the collector and supports a temporary bonding material.

5. The hollow fiber membrane module of claim 4, wherein the water supplying part supplies cold water or warm water.

6. The hollow fiber membrane module of claim 1, claim 2, or claim 4, wherein the housing has trapezoidal sections, and is radially disposed in the circumferential direction of the central water tube such that a side wall of one housing contacts a side wall of another housing.

7. The hollow fiber membrane module of claim 6, wherein the diffuser comprises:
   a main path provided in the lower part of the housing and communicating with the central air tube;
   a lateral diffusing plate communicating with the main path and extending upward along an inner wall of the housing, having a space between the inner wall of the housing and the lateral diffusing plate;
   a plurality of ejecting holes formed to have a predetermined distance from each other on the lateral diffusing plate so as to eject air;
   a central diffusing plate communicating with the lateral diffusing plate and extending to the center of the housing; and
   a plurality of ejecting holes formed to have predetermined distance on the central diffusing plate so as to eject the air.

8. The hollow fiber membrane module of claim 7, wherein one or more central diffusing plates are provided, and are disposed in parallel.

9. The hollow fiber membrane module of claim 7, wherein one or more central diffusing plates are provided, and the respective central diffusing plates are disposed in a circumferential direction of the central water tube.

10. The hollow fiber membrane module of claim 1, claim 2, or claim 4, further comprising:
    an anti-backflow means disposed between the central air tube and a respective small module, and only flowing the air toward the diffuser.

11. The hollow fiber membrane module of claim 10, wherein the anti-backflow means comprises:
    a valve seat disposed at the entrance side of the exit;
    a valve selectively contacting with the valve seat so as to open and close the valve seat;
    a spring seat disposed at the outlet side of the exit, and having a hole passing the air at the center part; and
    a spring elastically disposed between the spring seat and the valve.

12. The hollow fiber membrane module of claim 10, wherein the anti-backflow means comprises:
    a valve block disposed in a main path of the diffuser, and having a path communicating with the connecting part; and
    a closing plate rotatably disposed in the slope formed in the valve block, and selectively opening and closing the path.

13. The hollow fiber membrane module of claim 10, wherein the anti-backflow means comprises:
    a check valve block disposed at the lower part of the central air tube, having a intake hole disposed to face downward and a plurality of exhaust holes formed in the circumferential surface, and connecting the intake hole to the exit; and
    a ball disposed to be movable up and down, and being lifted by the air flowing in through the intake hole so as to connect the intake hole to the exhaust hole.

14. The hollow fiber membrane module of claim 13, wherein a sealing material is further disposed on the lower part of the intake hole.

15. The hollow fiber membrane module of claim 10, wherein the anti-backflow means comprises:
- a seat disposed on the inner circumferential wall of the central air tube; and
- a closing plate disposed with a bracket in the central air tube and elastically contacting with the seat so as to selectively open and close the central air tube.

16. The hollow fiber membrane module of claim 1, claim 2, or claim 4, further comprising:
- an opening and closing means disposed between the central water tube and the collector of the respective small module, and shutting off the flowing line of the treated water.

17. The hollow fiber membrane module of claim 16, wherein the opening and closing means comprises:
- a plug rotatably mounted on the lower part of a respective inlet formed in the central water tube;
- a wire disposed to connect to the upper part of the plug; and
- an operation bar slidably mounted at the upper part of the central water tube and having a lower part connected to the wire so as to pull the wire.

18. The hollow fiber membrane module of claim 17, wherein the plug is made of rubber, polyurethane, or silicon.

19. A method for manufacturing a hollow fiber membrane module, wherein a method for fixing a hollow fiber membrane to a housing where a diffuser, a collector, and a fixing part are integrally provided, comprises:
- inserting a bag into the collector of the housing and allocating a space for supplying water; pouring a temporary bonding material on the allocated space and fixing a bundle of hollow fiber membranes;
- hardening the temporary bonding material and forming a complete bonding material thereon;
- hardening the complete bonding material; and
- withdrawing the temporary bonding material.

20. The method for manufacturing a hollow fiber membrane module of claim 19, further comprising:
- supplying warm water into the bag before pouring the temporary bonding material; and
- supplying cold water into the bag after forming a bundle of hollow fiber membranes on the liquefied temporary bonding material.

* * * * *